(12) United States Patent
Yudelevitch (10) Patent No.: US 8,688,523 B1
(45) Date of Patent: Apr. 1, 2014

(54) SYSTEM, METHOD AND COMPUTER PROGRAM PRODUCT FOR PROVIDING MULTIPLE MODES OF COMMUNICATION BETWEEN AN ADVERTISER AND A USER

(75) Inventor: Boaz Yudelevitch, Hod Hasharon (IL)

(73) Assignee: Amdocs Software Systems Limited, Dublin (IE)

(*) Notice: Subject to any disclaimer, the term of this patent is extended or adjusted under 35 U.S.C. 154(b) by 1323 days.

(21) Appl. No.: 11/467,013

(22) Filed: Aug. 24, 2006

(51) Int. Cl.
*G06Q 30/00* (2012.01)
*G05B 19/418* (2006.01)

(52) U.S. Cl.
USPC .................................... 705/14.73; 709/206

(58) Field of Classification Search
USPC .................. 705/14, 14.73; 709/206
See application file for complete search history.

(56) References Cited

U.S. PATENT DOCUMENTS

| 7,272,633 B2 * | 9/2007 | Malik et al. ............... 709/206 |
| 2001/0014895 A1 * | 8/2001 | Sappal ...................... 707/500 |
| 2002/0065718 A1 | 5/2002 | Otani et al. ................ 705/14 |
| 2004/0236843 A1 * | 11/2004 | Wing et al. ................. 709/219 |
| 2005/0288953 A1 | 12/2005 | Zheng ......................... 705/1 |
| 2006/0149624 A1 * | 7/2006 | Baluja et al. ............... 705/14 |
| 2007/0239524 A1 * | 10/2007 | Tewahade .................. 705/14 |
| 2008/0010125 A1 * | 1/2008 | Wright ........................ 705/14 |

OTHER PUBLICATIONS

"Big changes ahead for telephone directories". Eder, Peter F. Futurist v33n4 pp. 51-54. Apr. 1999.*

* cited by examiner

*Primary Examiner* — Victoria Vanderhorst
(74) *Attorney, Agent, or Firm* — Zilka-Kotab, PC (57) ABSTRACT

A system, method and computer program product are included for providing multiple modes of communication between an advertiser and a user. In use, an advertisement capable of being used to initiate communication between an advertiser and a user is displayed, utilizing a network. Further displayed is a plurality of modes of communication capable of being selected by the user in association with the advertisement. Still yet, computer code required to enable at least one of the modes of communication may be downloaded to a device of the user.

24 Claims, 6 Drawing Sheets

SYSTEM, METHOD AND COMPUTER PROGRAM PRODUCT FOR PROVIDING MULTIPLE MODES OF COMMUNICATION BETWEEN AN ADVERTISER AND A USER

FIELD OF THE INVENTION

The present invention relates to network communications, and more particularly to network communications involving advertisers.

BACKGROUND

Networked computers have largely expanded advertisers' abilities to advertise to the general public. Advertisers currently advertise on web pages and/or other types of graphical user interfaces capable of presenting advertisements utilizing a network. In particular, advertisers have generally utilized embedded text, banners, pop-ups, e-mail, etc. in presenting their advertisements to users (e.g. potential customers, etc.) who have access to an associated network. In addition, advertisers have also provided advertisements through on-line directories (e.g. yellow pages, etc.).

However, such advertisements are traditionally limited to providing descriptive information within the corresponding graphical user interfaces. For example, on-line advertising is generally only able to provide static information associated with the advertisement itself (e.g. text, links to web pages, e-mail editor links, etc.). This static method of communicating information has limited advertisers' ability to communicate with users.

Specifically, on-line advertisers are currently unable to effectively take advantage of the various networking communication methods currently available [e.g. short message service (SMS), multimedia messaging service (MMS), on-line facsimile, etc.] in association with their advertisements. There is thus a need for overcoming these and/or other problems associated with the prior art.

SUMMARY

A system, method and computer program product are included for providing multiple modes of communication between an advertiser and a user. In use, an advertisement capable of being used to initiate communication between an advertiser and a user is displayed, utilizing a network. Further displayed is a plurality of modes of communication capable of being selected by the user in association with the advertisement. Still yet, computer code required to enable at least one of the modes of communication may be downloaded to a device of the user.

DETAILED DESCRIPTION

Figure 1:
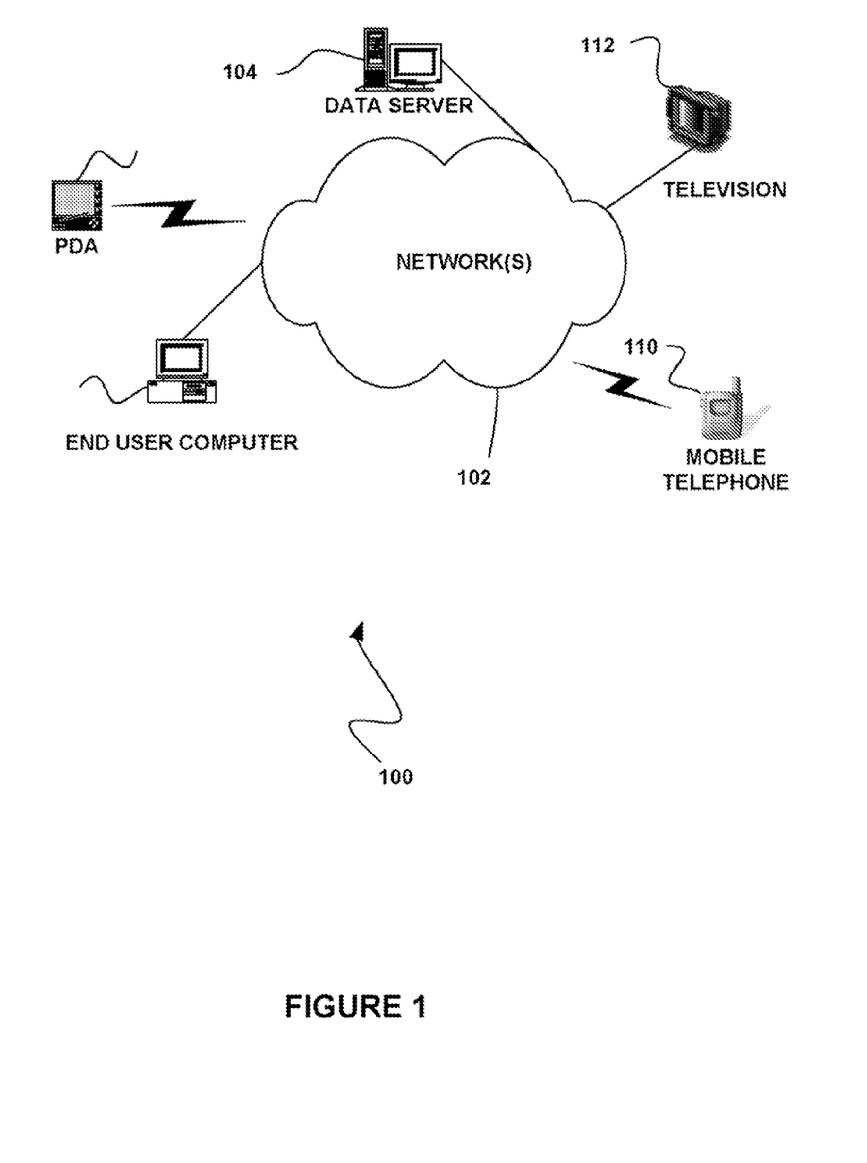
FIG. 1 illustrates a network architecture, in accordance with one embodiment.

FIG. 1 illustrates a network architecture 100, in accordance with one embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

It should be noted that any of the foregoing devices in the present network architecture 100, as well as any other unillustrated hardware and/or software, may be equipped with the capability of providing multiple modes of communication between an advertiser and a user. More information regarding such capability will be set forth hereinafter in greater detail during reference to subsequent figures.

Figure 2:
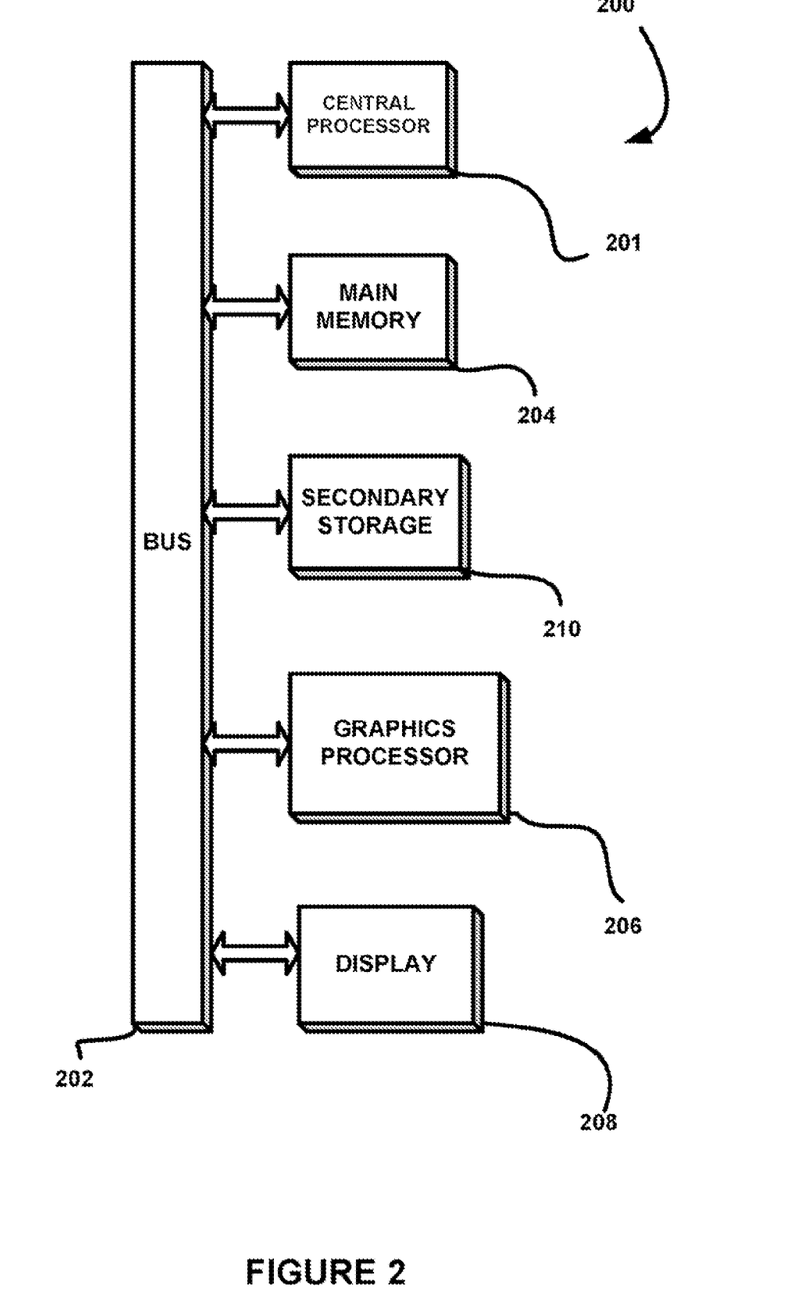
FIG. 2 illustrates an exemplary computer system, in accordance with one embodiment.

FIG. 2 illustrates an exemplary computer system 200, in accordance with one embodiment. As an option, the computer system 200 may be implemented in the context of any of the devices of the network architecture 100 of FIG. 1. Of course, the computer system 200 may be implemented in any desired environment.

As shown, a computer system 200 is provided including at least one central processor 201 which is connected to a communication bus 202. The computer system 200 also includes main memory 204 [e.g. random access memory (RAM), etc.]. The computer system 200 also includes a graphics processor 206 and a display 208.

The computer system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the computer system 600 to perform various functions. Memory 204, storage 210 and/or any other storage are possible examples of computer-readable media.

Figure 3:
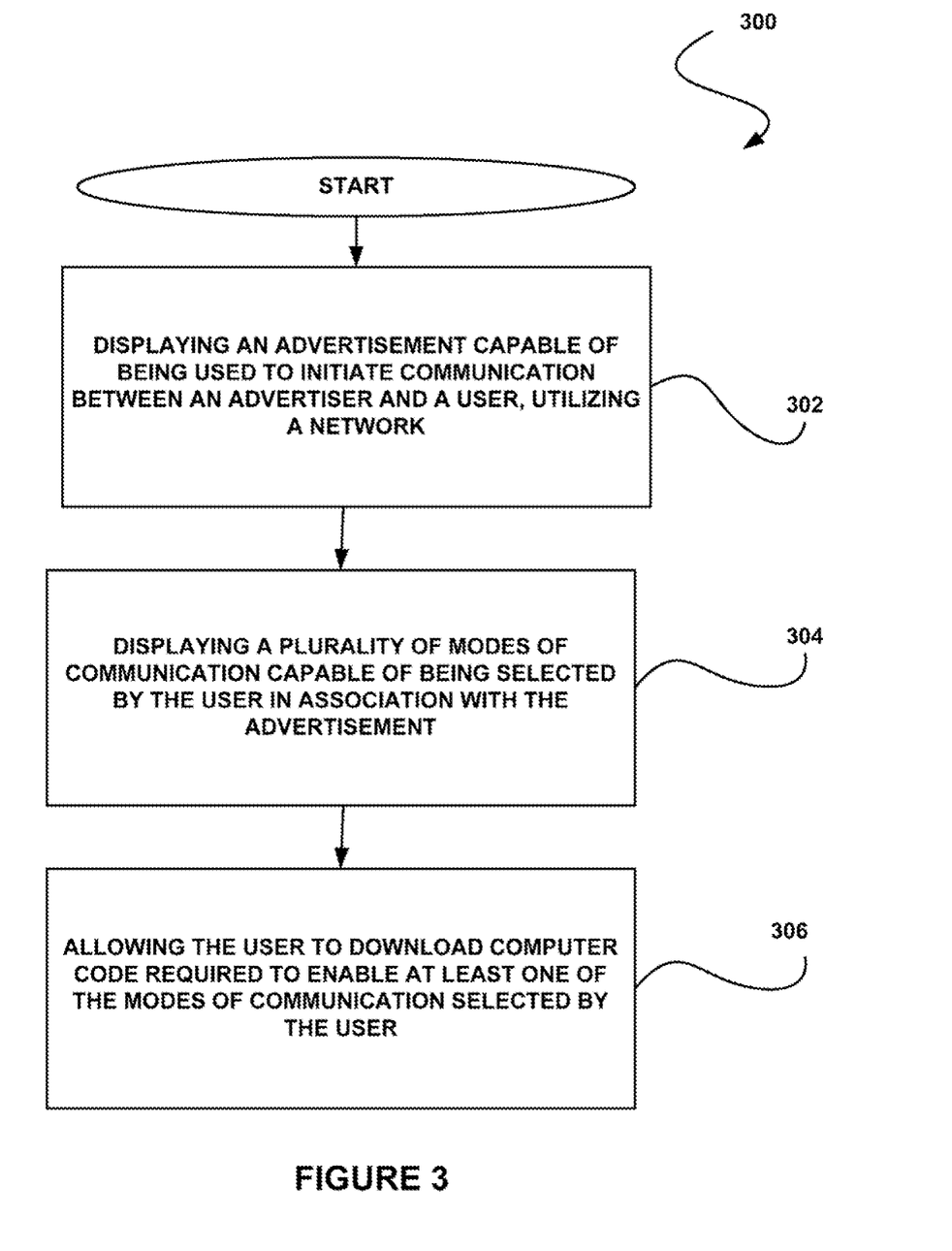
FIG. 3 shows a method for providing a plurality of modes of communication between an advertiser and a user in association with an advertisement, in accordance with one embodiment.

FIG. 3 shows a method 300 for providing a plurality of modes of communication between an advertiser and a user in association with an advertisement, in accordance with one embodiment. As an option, the method 300 may be implemented in the context of the details of FIGS. 1 and/or 2. Of course, however, the method 300 may be carried out in any desired environment. Further, the aforementioned definitions may equally apply to the description below.

As shown in operation 302, an advertisement capable of being used to initiate communication between an advertiser and a user is displayed, utilizing a network. Just by way of example, the network may include the network described with respect to FIG. 1, but of course may include any network capable of displaying an advertisement.

In the context of the present description, the advertisement may include any type of data presentation used for advertisement purposes. For instance, in various optional embodiments, the advertisement may include an audio, video, text-based, etc. presentation capable of being presented.

In different embodiments, the advertisement may be included in any type of graphical user interface (GUI) capable of being displayed utilizing the network. For example, the advertisement may be presented by way of embedded text, a banner, a pop-up, etc. As a further option, the advertisement may be included in a commercial directory (e.g. on-line yellow pages, etc.). As will be described below, such GUI may further be used to initiate communication between the advertiser and the user.

Still yet, in different embodiments, the advertisement may include a commercial advertisement, a personal advertisement, etc. Thus, the advertiser may include any commercial entity, organization, individual, and/or any other entity (and/or a representative, agent, employee, etc. thereof) capable providing an advertisement utilizing the network as well as communicating with the user. In addition, the user may include any individual and/or entity capable of accessing the network. For example, the user may include an individual utilizing a device capable of accessing the network such as, for instance, any one or more of the devices described above with respect to FIGS. 1 and/or 2.

Still yet, a plurality of modes of communication capable of being selected by the user in association with the advertisement is also displayed. See operation 304. Again, such modes of communication may be displayed utilizing a GUI.

In one embodiment, the advertisement and the selectable modes of communication may be displayed on a single interface. Of course, the advertisement and the selectable modes of communication may also optionally be displayed on separate interfaces. Thus, in one exemplary embodiment, a separate GUI (e.g. pop-up, etc.) containing the selectable modes of communication may be displayed in response to the selection of an option associated with an advertisement displayed on a separate GUI.

In the context of the present description, the modes of communication may include any type of voice communication, electronic mail communication, electronic messaging communication, facsimile communication and/or any other type of communication capable of being carried out between the advertiser and the user. Specifically, in various optional embodiments, the modes of communication may include short message service (SMS) communication, multimedia message service (MMS) communication, telephone communication, voice over Internet protocol (VoIP) communication, instant messenger communication, NetMeeting® communication, etc.

The modes of communication may be selected in any desired manner. For instance, in one embodiment, the modes of communication may include selectable links, selectable check boxes associated with descriptive modes of communication, etc. Thus, a plurality of modes of communication may be provided to a user in association with an advertisement such that the user may select one or a plurality of such modes for communicating with the advertiser (e.g. a representative associated with the advertisement, etc.).

Still yet, the user may be allowed to download computer code required to enable at least one of the modes of communication selected by the user, as shown in operation 306. Thus, if a mode of communication displayed in association with the advertisement is not supported by a device utilized by the user to receive the advertisement, the user may be allowed to download computer code (e.g. an application, driver, library, executable, patch, upgrade and/or any other software, etc.) capable of providing support for such communication mode functionality. In this way, a device utilized by a user may be provided with functionality capable of facilitating communication between the user and the advertiser via a selected mode.

More illustrative information will now be set forth regarding various optional architectures and uses in which the foregoing method 300 may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
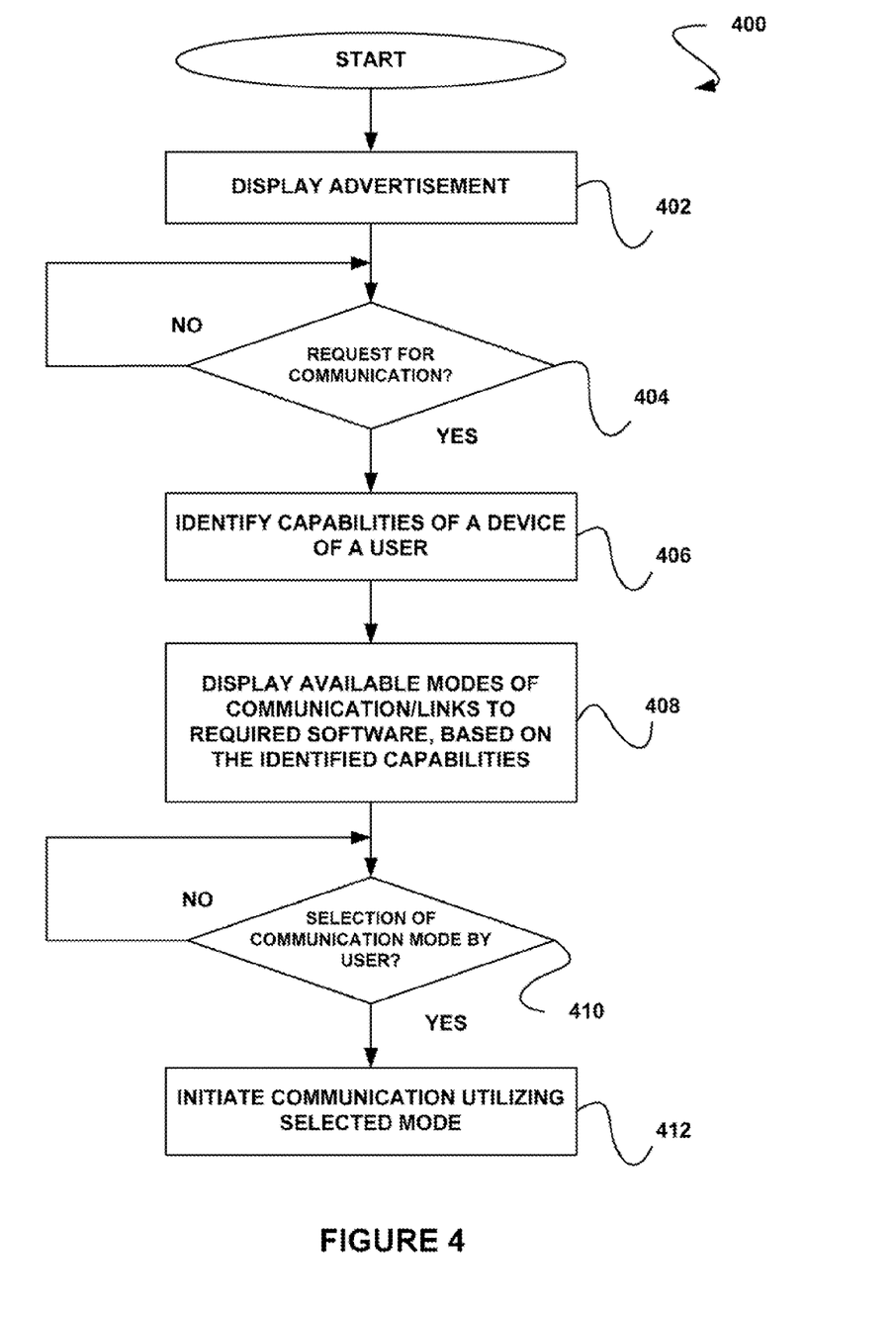
FIG. 4 shows a method for initiating communication between an advertiser and a user, by way of an advertisement, utilizing at least one available mode of communication, in accordance with another embodiment.

FIG. 4 shows a method for initiating communication between an advertiser and a user, by way of an advertisement, utilizing at least one available mode of communication, in accordance with another embodiment. As an option, the method 400 may be implemented in the context of the details of FIGS. 1-3. Of course, however, the method 400 may be carried out in any desired environment. Again, the aforementioned definitions may equally apply to the description below.

As shown in operation 402, an advertisement is displayed. Again, the advertisement may be displayed utilizing any device capable of displaying an advertisement over a network. In addition, a mode of payment preferred by the advertiser may also be displayed in association with the advertisement. In particular, a link to a payment processing application may be provided and/or information required for making a payment may be displayed in association with the advertisement.

It may next be determined whether a user has requested communication in association with the displayed advertisement, as shown in decision 404. For example, the user may request that communication with an advertiser associated with the advertisement be initiated. Such request may be made utilizing an option located on a GUI displaying the advertisement. The method 400 continues to wait until it is determined in decision 404 that a request from a user has been made.

If it is determined in operation 404 that a request has been made, capabilities of a device of the user are identified, as shown in operation 406. Such device may include any device described hereinabove. Of course, such device may also include any other device capable of displaying an advertisement and receiving a request from a user.

As an option, a list of communication modes utilized by the advertiser may be identified. The list of communication modes may then be utilized to determine whether the user's device supports each of such listed communication modes. For instance, the determination may include determining whether appropriate computer code (e.g. software, etc.) is installed on the user's device that is capable of facilitating the use of the communication modes.

Specifically, it may be determined whether the user's device is equipped with the software required to enable each communication mode. As an option, such determination may be made utilizing a registry of the device. For example, the registry may be reviewed to identify any evidence of the installation of appropriate software. Of course, the determination may also be made in any desired manner capable of identifying whether software capable of enabling communication modes is present on the user's device.

Based on the capabilities identified in operation 406, available modes of communication and links to required software may be displayed. Note operation 408. Such display may be performed utilizing any type of GUI. For example, the display may be provided on an interface separate from the advertisement, or may be provided on the same interface as the advertisement.

In one embodiment, for each mode of communication for which the user's device is enabled, such enabled modes of communication may be made available for selection by the user. For example, the enabled modes of communication may be listed as selectable links. Of course, the enabled modes of communication may be selectable in any desired manner. Thus, the user may be allowed to immediately initiate communications with an advertiser utilizing at least one communication mode already enabled by the user's device.

In another embodiment, for each mode of communication for which the user's device is not enabled, links to software required for enabling such modes of communication may be made available to the user. As another option, simple notifications of such required software may be made available to the user. For instance, such mode(s) of communication not enabled by the user's device may be displayed as being disabled/unselectable along with a notification that required software (e.g. driver, libraries, etc.) need to be downloaded in order to utilize such communication mode(s).

In this way, in addition to being allowed to select communication modes already supported by the user's device, the user may also be provided with the opportunity to download software required for additional communication modes not yet enabled by the user's device. Further, the user may be provided with a plurality of types of communication modes, whether or not currently supported by the user's device. Of course, such communication modes made available to the user in association with the advertisement may be limited to communication modes pre-selected by an advertiser associated with the advertisement.

It may then be determined whether a user has selected at least one displayed and selectable communication mode, as indicated in decision 410. If the user has selected a communication mode enabled by the user's device, direct communication between the user and the advertiser may be initiated utilizing the selected communication mode, as in operation 412. Thus, the user may initiate the communication with the advertiser without having to download software.

If, however, the user has selected a communication mode not enabled by the user's device, the user may be prompted to manually download software required to enable the communication mode. As another option, downloading of software required to enable the communication mode may be carried out automatically. Thus, if it is determined that the user has selected a communication mode not enabled by the user's device, software required to enable such communication mode may be automatically downloaded upon such determination.

As yet another option, required software may be automatically downloaded upon the selection of a link associated with a communication mode such as, for example, the link described above with respect to operation 408 (without necessarily displaying the links to download required software, etc.). In even another embodiment, the required software may be automatically downloaded after operation 406 without necessarily a need for user intervention in the form of a selection of a desired communication mode, etc.

In any of the above described embodiments, the user may be provided with software required to utilize communication modes not already enabled the user's device. Once the download has been completed, the user may then initiate direct communication with the advertiser utilizing the selected communication mode, as shown in operation 412.

If in decision 410 it is determined that the user has selected more than one communication mode, software needed by the user's device to enable any of such communication modes may be simultaneously downloaded. In addition, at least one of the selected communication modes may be utilized to initiate communication between the user and the advertiser, as in operation 412. Thus, in such embodiment, multiple communication modes may be initiated.

By this design, an advertisement may offer a wide variety of communication modes to establish communication between a user and an associated advertiser. The communication modes may therefore be available with respect to an advertisement in a flexible manner. Specifically, the communication modes may be dynamically made available by allowing any number of modes of communication to be offered to a user irrespective of the capabilities of the user's device, etc.

Figure 5:
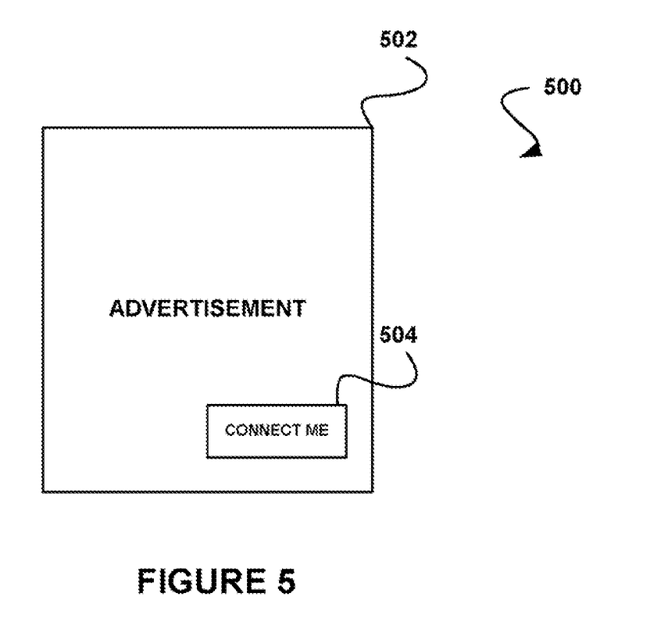
FIG. 5 shows a graphical user interface (GUI) for initiating communication between an advertiser and a user in association with an advertisement, in accordance with one embodiment.

FIG. 5 shows a GUI 500 for initiating communication between an advertiser and a user in association with an advertisement, in accordance with yet another embodiment. As an option, the GUI 500 may be implemented in the context of the details of FIGS. 1-4. Of course, however, the GUI 500 may be carried out in any desired environment. Again, the aforementioned definitions may equally apply to the description below.

As shown, the GUI 500 is provided for displaying an advertisement 502. The GUI 500 may also display a communication option 504. The communication option 504 may be utilized for initiating communication between an advertiser associated with the advertisement 502 and a user that selects the communication option 504. Thus, the GUI 500 may display an advertisement to a user while also allowing the user to directly make a selection to initiate communication with an advertiser associated with the advertisement.

Figure 6:
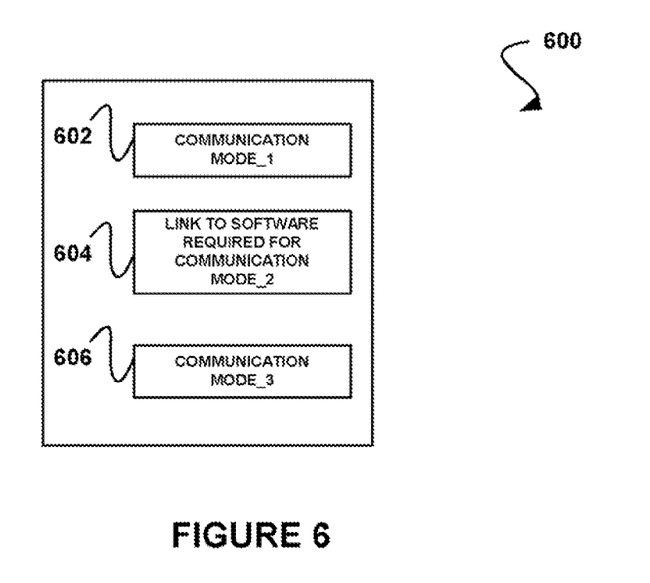
FIG. 6 shows another GUI for providing a plurality of modes of communication between an advertiser and a user in association with an advertisement, in accordance with another embodiment.

FIG. 6 shows a GUI 600 for providing a plurality of modes of communication between an advertiser and a user in association with an advertisement, in accordance with yet another embodiment. As an option, the GUI 600 may be implemented in the context of the details of FIGS. 1-5. Of course, however, the GUI 600 may be carried out in any desired environment. Again, the aforementioned definitions may equally apply to the description below.

The GUI 600 may be presented to a user upon the user's selection of a communication option associated with an advertisement. Just by way of example, the communication option may include that described above with respect to FIG. 5. The GUI 600 may provide communication modes capable of being used to initiate communication between the user and an advertiser. As shown, the GUI 600 may provide selectable communication modes for communication modes that are enabled by the user's device (i.e. communication mode_1 602 and communication mode_3 606).

The GUI 600 may also provide links to software required for facilitation of communication modes not enabled by the user's device (i.e. communication mode_2 604). Thus, if the user desires to utilize a communication mode not already enabled by the user's device, the user may select the link to download the required software. As an option, upon downloading the software, the GUI 600 may be updated to reflect the enabled communication mode.

Of course, the GUI 600 is set forth for illustrative purposes only and should not be construed as limiting in any manner. For example, as set forth in the context of the method 400 of FIG. 4, the links shown with respect to the communication mode_2 604 may not necessarily be shown in embodiments where any required software is downloaded automatically, etc.

Figure 7:
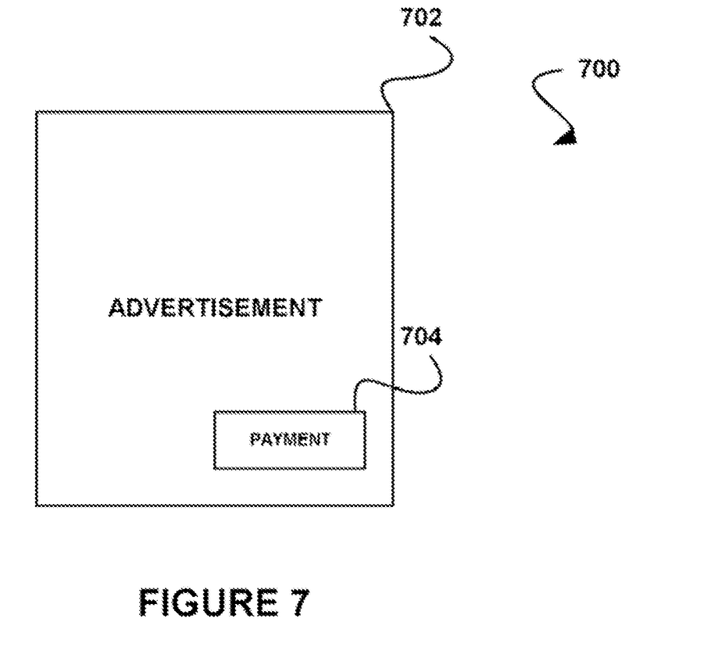
FIG. 7 shows a GUI for providing a payment option to a user in association with an advertisement, in accordance with yet another embodiment.

FIG. 7 shows a GUI 700 for providing a payment option to a user in association with an advertisement, in accordance with yet another embodiment. As an option, the GUI 700 may be implemented in the context of the details of FIGS. 1-6. Of course, however, the GUI 700 may be carried out in any desired environment. Again, the aforementioned definitions may equally apply to the description below.

As shown, the GUI 700 may provide a payment option 704 in association with an advertisement 702 for allowing a user to make a payment to an advertiser. In one embodiment, the payment option 704 may include a link to a payment processing application. In particular, the payment processing application may be provided for making a payment. In another embodiment, information required for making a payment may be displayed in association with the advertisement 702. Thus, a user may be capable of making a payment to an advertiser utilizing an advertisement 702.

Figure 8:
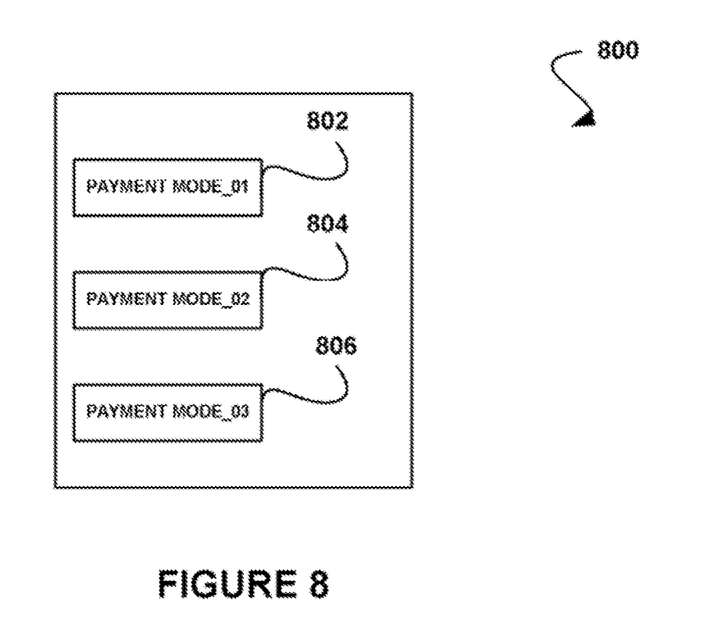
FIG. 8 shows a GUI for providing a plurality of payment options to a user in association with an advertisement, in accordance with yet another embodiment.

FIG. 8 shows a GUI 800 for providing a plurality of payment options to a user in association with an advertisement, in accordance with yet another embodiment. As an option, the GUI 800 may be implemented in the context of the details of FIGS. 1-7. Of course, however, the GUI 800 may be carried out in any desired environment. Again, the aforementioned definitions may equally apply to the description below.

As shown, the GUI 800 may provide a plurality of modes of payment (i.e. payment mode_1 802, payment mode_2 804, payment mode_3 806). Just by way of example, the modes of payment may include a credit card payment, a check payment; an e-check payment, a bank transfer payment, etc. Of course, any desired number of modes of payment may be displayed. Moreover, the GUI 800 may be displayed upon a user selection of a payment option associated with an advertisement, such as, for example, the payment option described above with respect to FIG. 7.

In one embodiment, the modes of payment may be displayed based on a selection by an advertiser. In particular, the advertiser may select acceptable modes of payment from a list of modes of payment. Thus, an advertiser may customize the modes of payment provided to a user in association with such advertiser's advertisement.

In another embodiment, a mode of payment preferred by the advertiser may be displayed. Such preferred mode of payment may be displayed alone or in conjunction with a plurality of non-preferred modes of payment. In this way, modes of payment may be provided to a user in association with an advertisement.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:

displaying an advertisement capable of being used to initiate communication between an advertiser and a user, utilizing a network; and in response to the user selecting an option associated with the advertisement on a first interface, displaying on a second interface a plurality of modes of communication capable of being selected by the user in association with the advertisement, where at least one of the modes of communication is not supported by a device of the user when the plurality of modes of communication capable of being selected are displayed;

receiving a user selection of one of the modes of communication that is not supported by the device of the user;

in response to the user selection, displaying a link for allowing the user to download to the device of the user computer code required to enable the one of the selected one of the modes of communication;

downloading to the device of the user the computer code required to enable the selected one of the displayed modes of communication that is not supported by the device of the user for providing to the device of the user functionality capable of facilitating communication via the selected one of the modes of communication;

upon downloading the computer code to the device of the user, updating the displayed modes of communication to reflect that the selected one of the displayed modes of communication for which the computer code was downloaded is enabled.

2. The method of claim 1, wherein the advertisement includes a pop-up advertisement.

3. The method of claim 1, wherein the modes of communication include at least one of voice communication, electronic mail communication, electronic messaging communication, and facsimile communication.

4. The method of claim 1, wherein the user is capable of selecting a plurality of the modes of communication.

5. The method of claim 1, wherein the download is carried out manually by the user.

6. The method of claim 1, further comprising determining whether the device of the user is equipped with the computer code required to enable at least one of the modes of communication.

7. The method of claim 6, wherein the link is conditionally displayed, based on the determination.

8. The method of claim 1, wherein the download is carried out automatically.

9. The method of claim 8, further comprising determining whether the device of the user is equipped with the computer code required to enable at least one of the modes of communication.

10. The method of claim 9, wherein the computer code is conditionally downloaded automatically, based on the determination.

11. The method of claim 1, wherein the computer code is conditionally downloaded based on the selection.

12. The method of claim 1, wherein the computer code includes a driver.

13. The method of claim 1, further comprising determining whether the device of the user is equipped with the computer code required to enable at least one of the modes of communication utilizing a registry.

14. The method of claim 1, and further comprising displaying a mode of payment preferred by the advertiser.

15. The method of claim 1, and further comprising initiating communications between the advertiser and the user, utilizing at least one of the modes of communication selected by the user.

16. A computer program product embodied on a non-transitory computer readable medium, comprising:
- computer code executable for displaying an advertisement capable of being used to initiate communication between an advertiser and a user, utilizing a network; and
- computer code executable for, in response to the user selecting an option associated with the advertisement on a first interface, displaying on a second interface a plurality of modes of communication capable of being selected by the user in association with the advertisement, where at least one of the modes of communication is not supported by a device of the user when the plurality of modes of communication capable of being selected are displayed;
- computer code executable for receiving a user selection of one of the modes of communication that is not supported by the device of the user;
- computer code executable for, in response to the user selection, displaying a link for allowing the user to download to the device of the user computer code required to enable the one of the selected one of the modes of communication;
- computer code executable for downloading to the device of the user the computer code required to enable the selected one of the displayed modes of communication that is not supported by the device of the user for providing to the device of the user functionality capable of facilitating communication via the selected one of the modes of communication;
- computer code executable for, upon downloading the computer code to the device of the user, updating the displayed modes of communication to reflect that the selected one of the displayed modes of communication for which the computer code was downloaded is enabled.

17. A sub-system, comprising:
a processor for:
- displaying an advertisement capable of being used to initiate communication between an advertiser and a user, utilizing a network; and
- in response to the user selecting an option associated with the advertisement on a first interface, displaying on a second interface a plurality of modes of communication capable of being selected by the user in association with the advertisement, where at least one of the modes of communication is not supported by a device of the user when the plurality of modes of communication capable of being selected are displayed;
- receiving a user selection of one of the modes of communication that is not supported by the device of the user;
- in response to the user selection, displaying a link for allowing the user to download to the device of the user computer code required to enable the one of the selected one of the modes of communication;
- downloading to the device of the user the computer code required to enable the selected one of the displayed modes of communication that is not supported by the device of the user for providing to the device of the user functionality capable of facilitating communication via the selected one of the modes of communication;
- upon downloading the computer code to the device of the user, updating the displayed modes of communication to reflect that the selected one of the displayed modes of communication for which the computer code was downloaded is enabled.

18. The method of claim 1, wherein the communication modes made available to the user in association with the advertisement are limited to communication modes pre-selected by the advertiser associated with the advertisement.

19. The method of claim 14, wherein the mode of preferred payment is displayed based on a selection by the advertiser associated with the advertisement.

20. The method of claim 13, wherein the determination of whether the device of the user is equipped with the computer code required to enable at least one of the modes of communication utilizing the registry is made by reviewing the registry to identify any evidence of an installation of appropriate software.

21. The method of claim 4, wherein if it is determined that the user has selected more than one of the modes of communication, computer code needed by the user's device to enable all of the selected modes of communication is simultaneously downloaded.

22. The method of claim 14, wherein the mode of preferred payment is displayed upon a user selection of a payment option associated with the advertisement.

23. The method of claim 1, wherein the computer code required to enable the at least one of the modes of communication includes an application.

24. The method of claim 1, wherein the computer code required to enable the at least one of the modes of communication includes a patch.

* * * * *